United States Patent [19]

Hargett et al.

[11] 4,174,873
[45] Nov. 20, 1979

[54] ELECTRICAL CONNECTOR FOR A VEHICLE

[76] Inventors: Jerry D. Hargett, 9460 Tegner Rd.; Alfred C. Nash, 19577 Crane Ave., both of Hilmar, Calif. 95324

[21] Appl. No.: 953,571

[22] Filed: Oct. 23, 1978

[51] Int. Cl.² .................................... H01R 33/00
[52] U.S. Cl. .................... 339/10; 339/94 A; 339/125 R; 339/126 R; 339/130 R
[58] Field of Search ............... 339/10, 94 A, 119 R, 339/125 R, 126 R, 130 R

[56] References Cited

U.S. PATENT DOCUMENTS

| | | | |
|---|---|---|---|
| 1,845,699 | 2/1932 | Brown | 339/125 R |
| 2,525,086 | 10/1950 | Wright et al. | 339/10 |
| 2,659,766 | 11/1953 | Fot | 339/126 R |
| 3,613,048 | 10/1971 | Brundza | 339/94 A X |

*Primary Examiner*—Roy Lake
*Assistant Examiner*—DeWalden W. Jones
*Attorney, Agent, or Firm*—Lothrop & West

[57] ABSTRACT

A vehicle having an internal storage battery and a body panel is provided with electrical connectors or fittings having portions extending through first and second openings in the body panel. Each fitting includes a conducting stem having an axial recess therein and includes an insulator head abutting one side of the body panel. One fitting has an insulator to prevent conduction between the stem and the body panel. Each threaded stem passes through an opening and receives a nut to clamp the insulator head against the body panel. A conductor extends from one stem to one pole of the internal storage battery. The other fitting is similar but is not insulated. Rather, it is electrically connected to the body panel or may have a conductor extending from the stem to the other pole of the internal storage battery. The fitting recesses receive electrical conductors in an exterior electrical circuit that may extend to another, external storage battery. There can be electrical transmission from the internal storage battery to the external storage battery or vice versa. Normally, the fitting recesses are protected by safety plugs readily removable when the device is to be used.

5 Claims, 5 Drawing Figures

ELECTRICAL CONNECTOR FOR A VEHICLE

BRIEF SUMMARY OF THE INVENTION

Vehicle storage batteries occasionally are without charge. This invention provides recesses on the vehicle body to receive a connecting, charging arrangement remote from gas evolving from the internal battery of the vehicle. There is a neat, safe, convenient body installation for the removable reception of a pair of electrical conductors. One conductor is insulated from the generally grounded body panel of the vehicle and is directly connected to the internal battery. The other conductor is connected through the grounded body panel to the battery. If the panel is not grounded, a second, direct connector to the storage battery is used. Removable protecting caps normally occupy the recesses. External electrical leads from a charging source are plugged into the two recesses in a location remote from any hydrogen gas generated by battery charging. There is an easy and effective temporary connection provided for charging purposes.

DETAILED DESCRIPTION

Figure 1:
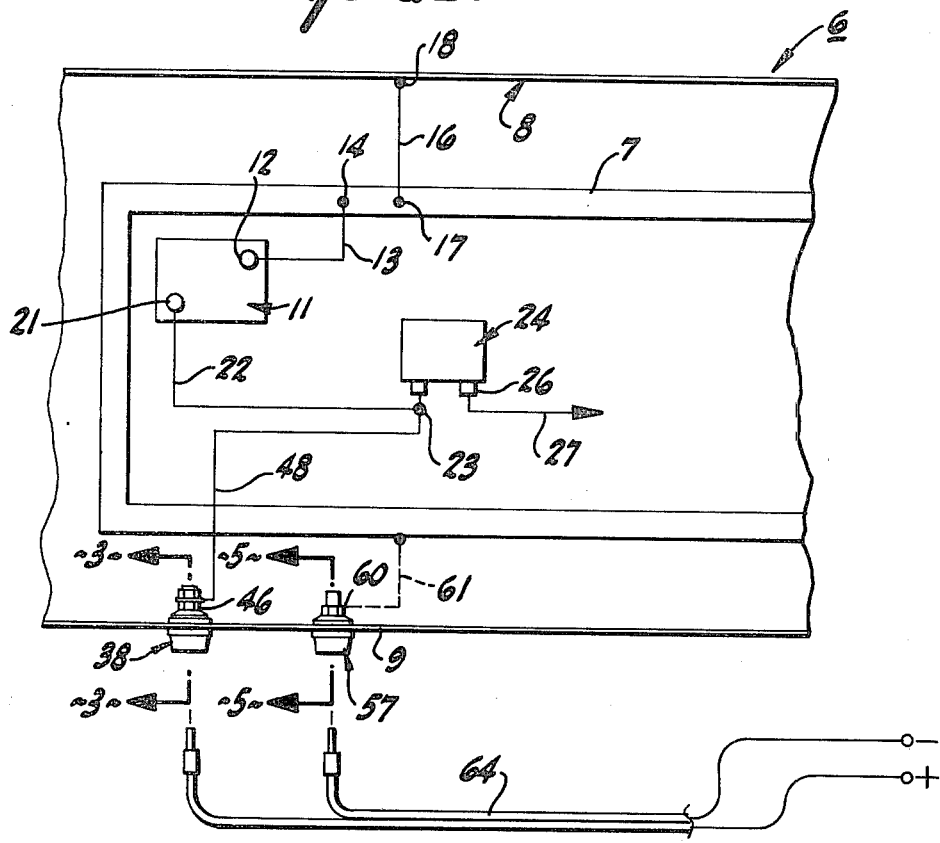
FIG. 1 is a schematic plan of a vehicle having an electrical connector pursuant to the invention installed thereon.
Figure 2:
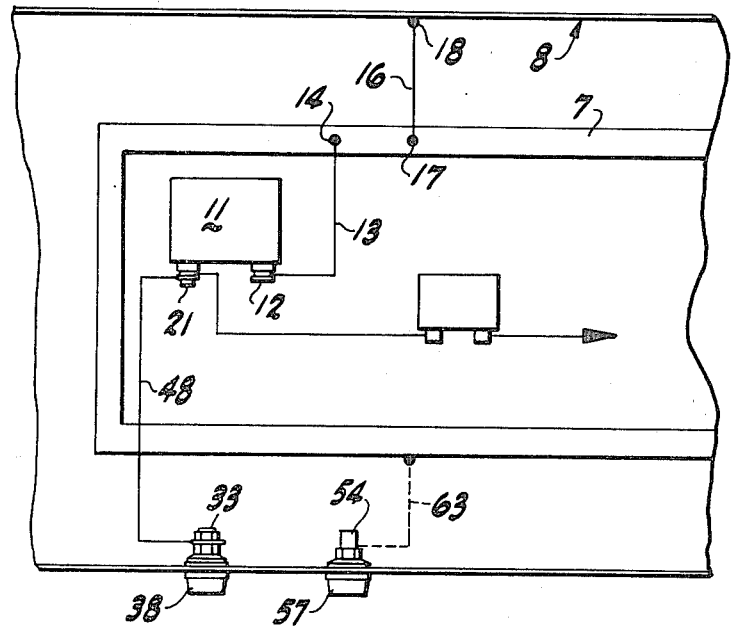
FIG. 2 is a plan similar to FIG. 1 but showing a slightly different installation on a vehicle with a different form of storage battery.

The device of the invention is primarily for use in connection with a vehicle such as a boat, truck, automobile or the like. In the present instance, an automobile 6 has a metallic frame 7 and has an enclosing body shell 8 including a panel 9 of metal. Situated on the body frame 7 is an interior, electrical storage battery 11 of the customary lead-acid sort having a terminal 12 or pole of one polarity connected by a conductor 13 to a terminal 14 on the vehicle frame 7, which serves as a ground. The metal body panel 9 also is either directly connected to the frame 7 and thus is grounded, or has a conductor 16 joined at one end 17 to the frame and at the other end joined at 18 to the body panel 9. In any event, the body shell and particularly the panel 9 has electrical continuity with the ground pole 12 of the battery 11.

In the usual vehicle construction, the other pole or terminal 21 of the battery 11 is of opposite polarity and is joined by a regularly provided conductor 22 to a terminal 23 on a suitable box 24, which represents a relay or a connector panel board. Another terminal 26 on the relay or board 24 has a conductor or conductors 27 leading to various electrical instrumentalities on the vehicle 6.

Pursuant to the present invention, there is provided in the panel 9 at a location quite remote from the battery 11 a first opening 31 and a second opening 32. The panel may be a radiator shell or skirt or a fender, rocker panel or load box, or the like far away from and shielded from the interior battery 11. The openings are not necessarily of the same size. Preferably the opening 31 is slightly larger in diameter than the opening 32, but both openings are provided adjacent each other, spaced apart, for example, a matter of three or four inches.

With respect to the opening 31, there is provided a first conducting stem 33 conveniently of metal having a hexagonal, enlarged head 34 and being provided with an axially extending central recess 36 open to the exterior. The stem is reduced in diameter from the head and is provided with external threads 37 throughout much of its length. The diameter of the threads 37 is such that the first stem 33 can easily go through the first opening 31 with substantial radial clearance.

Surrounding a portion of the stem and the head 34 is a first insulator body 38 preferably of molded plastic encompassing the periphery of the head 34. The body has an end face 39 normal to the axis of the stem 33 and is designed to abut the outside, for example, of the body panel 9. Furthermore, the body 38 has an integral, extended boss 41 designed snugly to fit into the enlarged first opening 31 and to extend more or less the entire distance therethrough.

Figure 3:
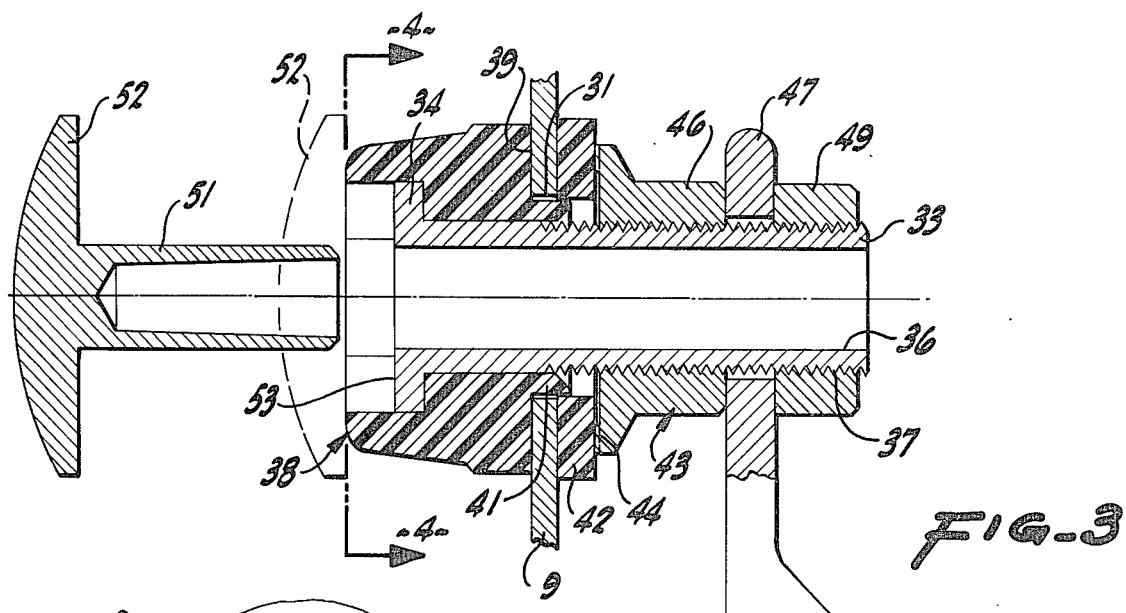
FIG. 3 is a cross-section to an enlarged scale, the plane of section being indicated by the line 3—3 of FIG. 1.
Figure 4:
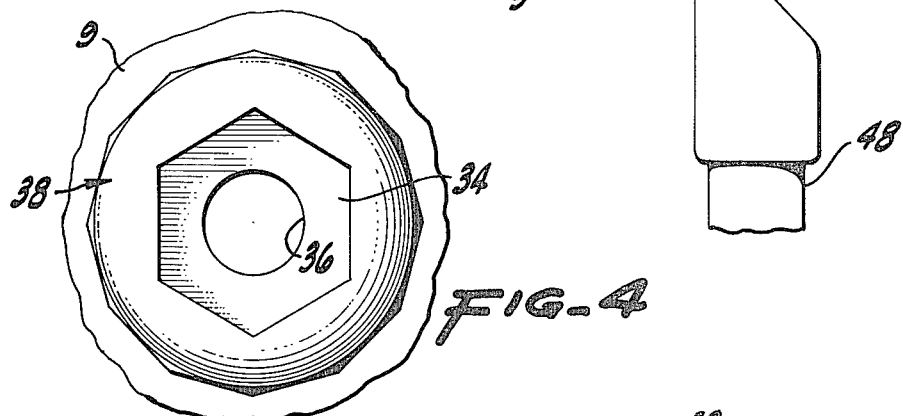
FIG. 4 is a partial end elevation, the plane of which is indicated by the line 4—4 of FIG. 3.

In use, the first stem 33 is positioned as shown in FIG. 3, and an insulating washer 42 is slipped over the stem 33 and moved toward the panel 9. A first nut 43, usually metal, preferably having a roughened end face 44, and having a hex portion 46, is threaded onto the first stem and is tightened thereon. The rough portion 44 of the nut digs into the washer 42 and compresses the washer, the end face 39 and the panel 9 into tight engagement but ensures that there is no metal contact between the stem 33 and the body panel 9. The two are fully insulated electrically from each other.

Also slipped over the stem 33 is an apertured terminal 47 of a first conducting cable 48 which also is connected to the terminal 23. Thus, electrical continuity is established between the first stem 33 and the pole 21 or terminal of the storage battery. Usually, a lock nut 49 is also screwed upon the stem 33 to hold the terminal 47 in position.

Under usual circumstances the recess 36 is adapted frictionally to receive a hollow and therefore slightly deformable shank 51 of a removable safety and protecting plug as shown in FIG. 3. The plug preferably is fabricated of nonconducting plastic and has an enlarged disc 52 integral with the stem 51. The disc overlies the otherwise exposed external face 53 of the head 34 and normally prevents ingress of foreign material into the recess 36 and prevents casual tampering with the structure.

In the smaller opening 32 there is inserted a second, conducting stem 54 having a recess 56 therein normally occupied by a plug shank similar to the plug shank 51. An insulator 57, like the insulator 38, has a hexagonal portion abutting the vehicle body 9 and preferably is molded onto the hexagonal end of the second stem 54 substantially identical to the stem 33. The body 57, however, has no boss like the boss 41. The body 57 carrying the stem 54 is pulled into abutment with the panel 9 surrounding the opening 32 therethrough by a second, roughened face nut 60 engaging threads on the second stem. Normally, electrical continuity is established between the stem 54 and the conducting body panel 9, as the roughened nut 60 serves, as tightened, to remove any insulating overlay and digging directly into the body panel. There is thus established electrical continuity between the second stem 54 and the second terminal 12 of the internal storage battery through the body, panel, the frame and any other metallic parts that are customarily joined.

It sometimes occurs that the body panel 9 or some intermediates may be either coated with insulating material or may be made of fiber glass or like electrically nonconducting material. In that instance, there is provided a second connector 61 engaging the second conducting stem 54 and having a nut 62 securing the connector 61 in place. A conductor 63 extends from the connector 54 either directly to the ground terminal 12 of the internal battery or to a conducting portion (frame 7) of the vehicle which does extend to such terminal. There is thus a second, complete conducting path.

Figure 5:
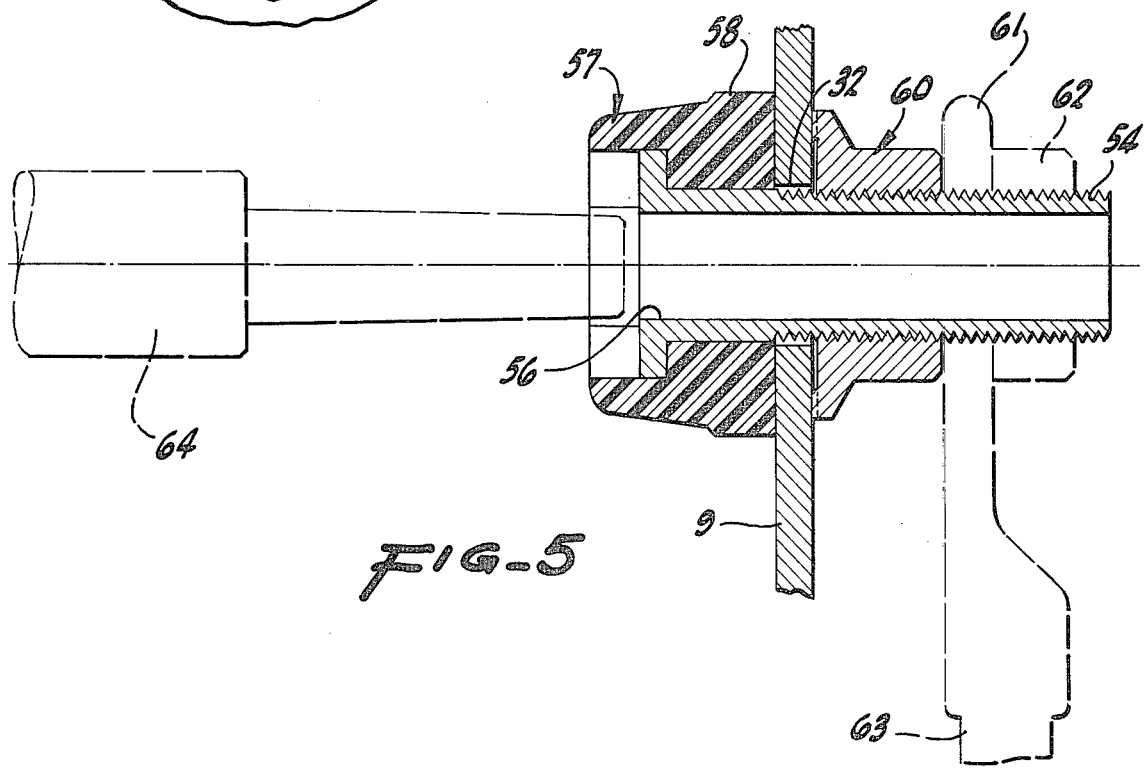
FIG. 5 is a cross-section, the plane of which is indicated by the line 5—5 of FIG. 1.

In the use of this device, it is assumed, for example, that the internal battery 11 is fully charged and that electricity is to be supplied to some other, external storage battery, perhaps on a second vehicle. In that instance, the two plug discs 52 are removed by the fingers or a screw driver, exposing the first recess 36 and the second recess 56. Into those recesses are plugged the respective ends of connecting cables such as the cable 64 shown in FIG. 5. The other ends of the cables are connected to the second, external battery in the customary way preferably prior to the connections into the recesses 36 and 56 and preferably at a substantial distance from the connecting points. Electrically then flows safely from the internal battery to the external battery. When the transaction is completed, the connecting terminals are removed in reverse order and the safety discs 52 are reinserted.

Under some circumstances, it may be that the internal battery 11 needs to be charged. In that instance, the terminals of cables from an exterior, charged battery are introduced into the recesses 36 and 56 after the safety discs 52 have been removed therefrom. When a battery such as the battery 11 is being charged, hydrogen gas is evolved therefrom. This is highly flammable. It is, therefore, important to have any electrical connections, such as in the stems 33 and 54, as remote as possible from any charging storage battery. There is then no likelihood of any sparks occurring upon conductor connection igniting any hydrogen evolved at the battery. For that reason the first and second stems 33 and 54 are disposed preferably low down on the far side of the vehicle 6. The installation is usually made in such a fashion that the exposed parts are actually attractive and do not disfigure the vehicle at all, and yet they are readily available for quick, safe use when needed.

We claim:

1. An electrical connector for a vehicle having a storage battery and a body panel with first and second openings therein comprising a first conducting stem having an axial recess therein, an insulator head on said first stem having one portion of a size to abut one side of said panel and having another portion of a size to pass into said first opening, first threads on said first stem of a size to pass through said first opening, a first nut rotatable on said first threads and disposed on the other side of said panel, first means for establishing electrical continuity between said first stem and one pole of said storage battery, a second conducting stem having an axial recess therein, a second enlarged insulator head on said second stem of a size to abut said one side of said panel around said second opening, second threads on said second stem of a size to pass through said second opening, a second nut rotatable on said second threads and disposed on said other side of said panel, and second means for establishing electrical continuity between said second stem and the other pole of said storage battery.

2. A device as in claim 1 in which said second means includes said body panel.

3. A device as in claim 1 in which said first conducting stem and said second conducting stem are both in locations substantially remote from hydrogen gas discharged by said storage battery.

4. A device as in claim 1 including insulating plugs frictionally engageable with said stems in said axial recesses.

5. A device as in claim 1 including an insulating washer disposed on said first conducting stem and interposed between said panel and said first nut.

* * * * *